US011686214B2

(12) United States Patent
Fioravanti et al.

(10) Patent No.: US 11,686,214 B2
(45) Date of Patent: Jun. 27, 2023

(54) TURBOMACHINE SYSTEMS WITH MAGNETIC BEARING COOLING AND METHOD

(71) Applicant: Nuovo Pignone Tecnologie Srl, Florence (IT)

(72) Inventors: Duccio Fioravanti, Florence (IT); Giuseppe Iurisci, Florence (IT); Paola Di Festa, Florence (IT); Giuseppe Sassanelli, Florence (IT)

(73) Assignee: Nuovo Pignone Tecnologie SRL, Florence (IT)

( * ) Notice: Subject to any disclaimer, the term of this patent is extended or adjusted under 35 U.S.C. 154(b) by 0 days.

(21) Appl. No.: 16/056,595

(22) Filed: Aug. 7, 2018

(65) Prior Publication Data

US 2019/0063257 A1    Feb. 28, 2019

(30) Foreign Application Priority Data

Aug. 31, 2017 (IT) .......................... 102017000097796

(51) Int. Cl.
*F01D 25/12*  (2006.01)
*F01D 25/16*  (2006.01)
(Continued)

(52) U.S. Cl.
CPC .......... *F01D 25/125* (2013.01); *F01D 15/005* (2013.01); *F01D 25/16* (2013.01);
(Continued)

(58) Field of Classification Search
CPC ........ F01D 25/125; F01D 25/16; F01D 15/00; F04D 29/058; F04D 25/06;
(Continued)

(56) References Cited

U.S. PATENT DOCUMENTS 6,943,469 B2 * 9/2005 Nelson ..................... H02K 9/04
                                                             310/52
7,278,818 B2 * 10/2007 Bosen .................. F01D 15/005
                                                            415/116
(Continued)

FOREIGN PATENT DOCUMENTS

EP        2 447 539 A2    5/2012
WO     2007/110275 A1    10/2007
(Continued)

OTHER PUBLICATIONS

Italian Search Report and Written Opinion issued in connection with corresponding IT Application No. 102017000097796 dated Feb. 27, 2018.

*Primary Examiner* — Igor Kershteyn
*Assistant Examiner* — Joshua R Beebe
(74) *Attorney, Agent, or Firm* — Baker Hughes Patent Org.

(57) ABSTRACT

A turbomachine system includes a turbomachine provided with a turbomachine rotor. The turbomachine rotor is comprised of a turbomachine shaft with a first shaft end and a second shaft end. The turbomachine shaft is supported by active magnetic bearings for rotation in a turbomachine casing. The turbomachine system further includes a rotary machine drivingly coupled to the first shaft end, and a first closed cooling circuit adapted to circulate a cooling fluid therein and fluidly coupled to the active magnetic bearings to remove heat therefrom. The closed cooling circuit includes a cooling fluid impeller mounted on the turbomachine shaft for rotation therewith and adapted to circulate the cooling fluid in the closed cooling circuit. The closed cooling circuit further includes a heat exchanger adapted to remove heat from the cooling fluid. A method of operating a turbomachine system is further disclosed.

20 Claims, 3 Drawing Sheets

(51) Int. Cl.
*F04D 29/058* (2006.01)
*F16C 37/00* (2006.01)
*F16C 32/04* (2006.01)
*F01D 15/00* (2006.01)
*F04D 25/06* (2006.01)

(52) U.S. Cl.
CPC .......... *F04D 29/058* (2013.01); *F16C 32/044* (2013.01); *F16C 32/0474* (2013.01); *F16C 37/005* (2013.01); *F04D 25/06* (2013.01); *F05D 2220/76* (2013.01); *F05D 2240/14* (2013.01); *F05D 2240/51* (2013.01); *F05D 2240/515* (2013.01); *F05D 2260/213* (2013.01); *F16C 2360/00* (2013.01); *F16C 2360/23* (2013.01); *F16C 2360/44* (2013.01)

(58) Field of Classification Search
CPC ............ F05D 2220/76; F05D 2240/14; F05D 2240/51; F05D 2240/515; F05D 2260/213; F05D 2260/00; F05D 2260/23; F05D 2260/44; F16C 32/044; F16C 32/0474; F16C 2360/00; F16C 2360/23; F16C 2360/44; F16D 37/005
See application file for complete search history.

(56) References Cited

U.S. PATENT DOCUMENTS

| | | | | |
|---|---|---|---|---|
| 8,430,653 | B2* | 4/2013 | Frosini | F04D 29/05 310/90.5 |
| 8,823,223 | B2* | 9/2014 | Han | B60L 50/51 310/54 |
| 2004/0179961 | A1* | 9/2004 | Pugnet | F04D 17/125 417/423.5 |
| 2005/0142004 | A1* | 6/2005 | Appleford | F04D 25/06 417/371 |
| 2005/0158172 | A1* | 7/2005 | Snyder | F01D 15/10 415/206 |
| 2007/0013241 | A1* | 1/2007 | Schiferl | H02K 1/32 310/54 |
| 2013/0220285 | A1* | 8/2013 | Hayashi | F04D 25/06 123/565 |
| 2016/0025106 | A1* | 1/2016 | Gilarranz | F04D 25/0606 417/53 |

FOREIGN PATENT DOCUMENTS

| | | |
|---|---|---|
| WO | 2015/032510 A1 | 3/2015 |
| WO | 2016/087303 A1 | 6/2016 |
| WO | 2016/170012 A1 | 10/2016 |
| WO | 2017/050445 A1 | 3/2017 |

\* cited by examiner

TURBOMACHINE SYSTEMS WITH MAGNETIC BEARING COOLING AND METHOD

FIELD OF INVENTION

The present disclosure concerns turbomachine systems. Embodiments disclosed herein specifically concern systems including one or more turbomachines with respective rotors supported by active magnetic bearings and drivingly coupled to another rotary machine.

BACKGROUND OF THE INVENTION

Turbomachines comprise a casing and a rotor with a shaft, supported in the casing for rotation therein. In some turbomachines, the rotor is supported by rolling bearings. Some known turbomachines are provided with hydrodynamic or hydrostatic bearings, instead of rolling bearings. All these kinds of bearings must be lubricated and require therefore a lubrication circuit, with lubrication pumps and coolers.

In more recent turbomachines, active magnetic bearings are used instead of rolling bearing, or hydrodynamic and hydrostatic bearings. Active magnetic bearings do not require lubrication, such that the structure of the turbomachine can be simplified. Active magnetic bearings, however, require cooling.

Integrated motor-compressors are known in the art (U.S. Pat. No. 8,430,653), wherein an electric motor and a centrifugal compressor are integrated in a single casing. The casing comprises a motor compartment, containing the electric motor, and a compressor compartment, housing the compressor. The two compartments are separated by a sealing arrangement around a shaft. A common shaft supports the rotor of the electric motor and the compressor rotor. The common shaft is supported for rotation in the casing by means of active magnetic bearings. A process gas is compressed by the compressor using mechanical power generated by the electric motor. A portion of the process gas is removed from the main flow of gas processed by the compressor and is used to cool the active magnetic bearings in the compressor compartment. The electric motor and the active magnetic bearings in the motor compartment are cooled by a cooling medium, which is caused to circulate in the motor compartment of the casing by means of an impeller mounted on a side of the rotor of the electric motor opposite the compressor compartment. Process gas is further delivered to the sealing which separates the compressor compartment from the motor compartment, thus providing a barrier between the motor compartment and the compressor compartment of the casing.

In some turbomachine systems, including at least one compressor and an electric motor, however, a complete separation between the interior of the compressor housing and the interior of the motor housing is required, e.g. in order to prevent contamination of the electric motor by the gas processed in the compressor. This may be required, for instance, when the process gas is a wet gas containing a liquid fraction, or a gas containing chemically aggressive contaminants, such as $H_2S$, chlorides, Hg, or other corrosive components.

A need therefore exists for an efficient cooling arrangement for turbomachine systems including at least one stand-alone turbomachine, i.e. a turbomachine, which requires a separate casing, for instance.

SUMMARY OF INVENTION

According to one aspect, a turbomachine system is disclosed herein, which comprises at least one turbomachine comprising a turbomachine rotor having a turbomachine shaft with a first shaft end and a second shaft end. The turbomachine shaft is supported by active magnetic bearings for rotation in a turbomachine casing. The turbomachine system further includes an additional rotary machine drivingly coupled to the first shaft end of the turbomachine shaft. A first closed cooling circuit is provided, adapted to circulate a cooling fluid therein and fluidly coupled to at least one, and preferably to all of the active magnetic bearings supporting the turbomachine shaft. The first closed cooling circuit is adapted to remove heat from one, some or all the active magnetic bearings supporting the turbomachine shaft. In embodiments disclosed herein, the first closed cooling circuit comprises a cooling fluid impeller mounted on the turbomachine shaft for rotation therewith and adapted to circulate the cooling fluid in the first closed cooling circuit. The first closed cooling further comprises at least one heat exchanger adapted to remove heat from the cooling fluid.

Particularly where the turbomachine processes a fluid which is incompatible with the active magnetic bearings, e.g. due to polluting agents contained therein, or to physical or chemical properties of the fluid, the cooling fluid circulating in the first closed cooling fluid circuit is a fluid different from the process fluid processed by the turbomachine.

For instance, the turbomachine can be a pump or a compressor. The turbomachine can process a chemically aggressive gas or gas mixture, or a fluid containing contaminants and/or polluting agents, particles or moisture, which shall not get in contact with the components of an active magnetic bearing. The use of a separate, clean cooling fluid in the first closed cooling circuit prevents damages to the active magnetic bearings and ensures safe operation and efficient cooling thereof.

For instance, the cooling fluid can be air, nitrogen or any other inert fluid or any fluid compatible with the active magnetic bearings, i.e. suitable for contact with the components of the active magnetic bearings.

In some embodiments, a sealing arrangement can be provided, adapted to fluidly separate the first closed cooling circuit from an internal volume of the turbomachine, containing a process fluid that is processed by the turbomachine. The sealing arrangement reduces or prevents leakages of process fluid, e.g. process gas from a compressor, towards the active magnetic bearings.

In some embodiments the sealing arrangement can include one or more dry gas seals. These latter can be fed with dry sealing gas, such as nitrogen or clean air.

The pressure of the dry gas in the dry gas seals and the pressure of the cooling fluid in the first closed cooling circuit are selected such that process fluid cannot penetrate into the active magnetic bearings and only inert or non-polluting fluid is vented into the environment from the dry gas seals.

In some embodiments, the cooling fluid impeller is mounted on a side of the turbomachine rotor opposite the first shaft end, i.e. on the side opposite the rotary machine, which is drivingly coupled to the turbomachine. The cooling fluid impeller can be, in an embodiment, mounted in a cantilever fashion, i.e. overhung on a turbomachine shaft end. This arrangement facilitates assembling of the cooling fluid impeller and access thereto, e.g. for maintenance or repairing purposes.

The rotary machine drivingly coupled to the turbomachine can comprise a second casing, separated from the turbomachine casing. A shaft line can be provided, extending between the turbomachine casing and the second casing, to drivingly connect the turbomachine and the rotary machine.

The turbomachine can be a driven turbomachine and the rotary machine coupled thereto can thus be a mechanical power generating machine. In other embodiments, the turbomachine can be a mechanical power generating machine and the rotary machine can be a load, driven into rotation by power generated by the turbomachine.

In some embodiments, the rotating machine is an electric machine, for instance an electric motor drivingly coupled to a driven turbomachine, or the rotating machine is an electric generator, drivingly coupled to a mechanical power generating turbomachine, e.g. a turbine or a turbo-expander.

According to a further aspect, a method of operating a turbomachine system is disclosed herein. The method comprises the following steps:

rotating a turbomachine shaft and a cooling fluid impeller mounted on the turbomachine shaft, for co-rotation therewith, the turbomachine shaft being supported by active magnetic bearings;

circulating cooling fluid in a first closed cooling circuit by means of the cooling fluid impeller;

removing heat from the active magnetic bearings supporting the turbomachine shaft.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

Figure 1:
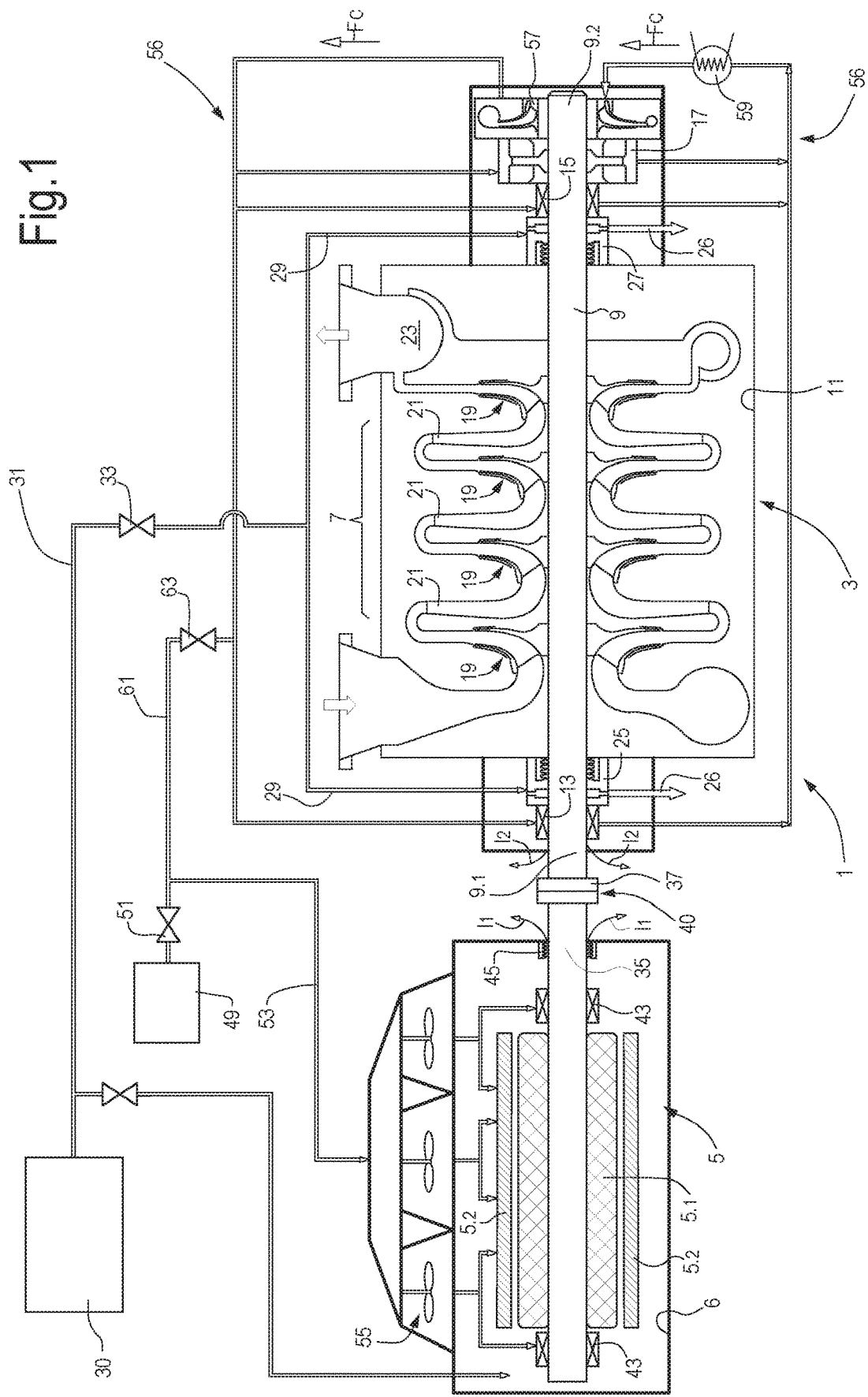
FIG. 1 illustrates a schematic of a turbomachine system according to a first embodiment.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

The turbomachine system disclosed herein includes two rotary machines. A first of said rotary machines is a turbomachine. As understood herein, a turbomachine is a rotary machine that transfers energy between a rotor and a fluid. As will become clear from the following detailed description, turbomachines of the systems disclosed herein can include both turbines and compressors, and more generally both driving turbomachines and driven turbomachines. While a turbine transfers energy from a fluid to a rotor and generates mechanical power therewith, a compressor transfers energy from a rotor to a fluid. The compressor is driven by a mover, e.g. a turbine, an electric motor, or any other mechanical power generating machine, i.e. machinery capable to transfer power to the rotor of the compressor.

Thus, according to some embodiments, the turbomachine is a compressor or a pump, driven by a mover, for instance an electric motor. The mover and the turbomachine are provided each with a respective casing and are separated from one another. A shaft line extends from the mover casing to the compressor casing to transfer power from the mover to the rotor of the compressor.

The mover can be provided with its own cooling circuit. The mover can be an electric motor. The mover can be provided with active magnetic bearings supporting the rotor of the mover, e.g. the rotor of the electric motor. The active magnetic bearings can be cooled by the same cooling circuit which removes heat from the rotor, for instance.

The compressor is configured to circulate a process gas therethrough. The shaft of the compressor rotor can be supported by active magnetic bearings. The active magnetic bearings of the compressor rotor are cooled through a closed cooling circuit separate from the cooling circuit of the mover. The cooling circuit of the active magnetic bearing of the compressor is a closed circuit and an impeller provides the power required to circulate the cooling fluid in the cooling circuit. The impeller is supported by the same shaft that supports the compressor rotor and is preferably mounted in an overhung configuration. One or more heat exchangers are provided to remove heat from the cooling circuit.

The cooling circuit for the active magnetic bearings of the turbomachine is particularly efficient. Leakages of process gas from the compressor towards the active magnetic bearings of the compressor and/or towards the mover are prevented. The consumption of cooling fluid is reduced. By supporting the impeller on the shaft of the compressor rotor a separate motor for the cooling circuit can be dispensed with. A simple structure is thus obtained.

In other embodiments, the turbomachine can be a turbine, or another mechanical power generation turbomachine. A closed cooling circuit for active magnetic bearings of the turbine shaft can be provided. The closed cooling circuit comprises again an impeller on the turbomachine shaft, which is directly driven by power generated by the turbine. At least one heat exchanger is provided in the cooling circuit to remove heat from the cooling fluid.

Turning now to the attached figures, FIG. 1 illustrates a turbomachine system 1 according to the present disclosure. The turbomachine system 1 comprises a turbomachine 3 and a rotary machine 5. In some embodiments, the turbomachine 3 is a driven turbomachine, such as compressor, for instance a centrifugal compressor or an axial compressor. The compressor 3 can be a single-stage or a multi-stage compressor.

In other embodiments, the turbomachine 3 can be a pump, for instance a centrifugal pump.

Figure 2:
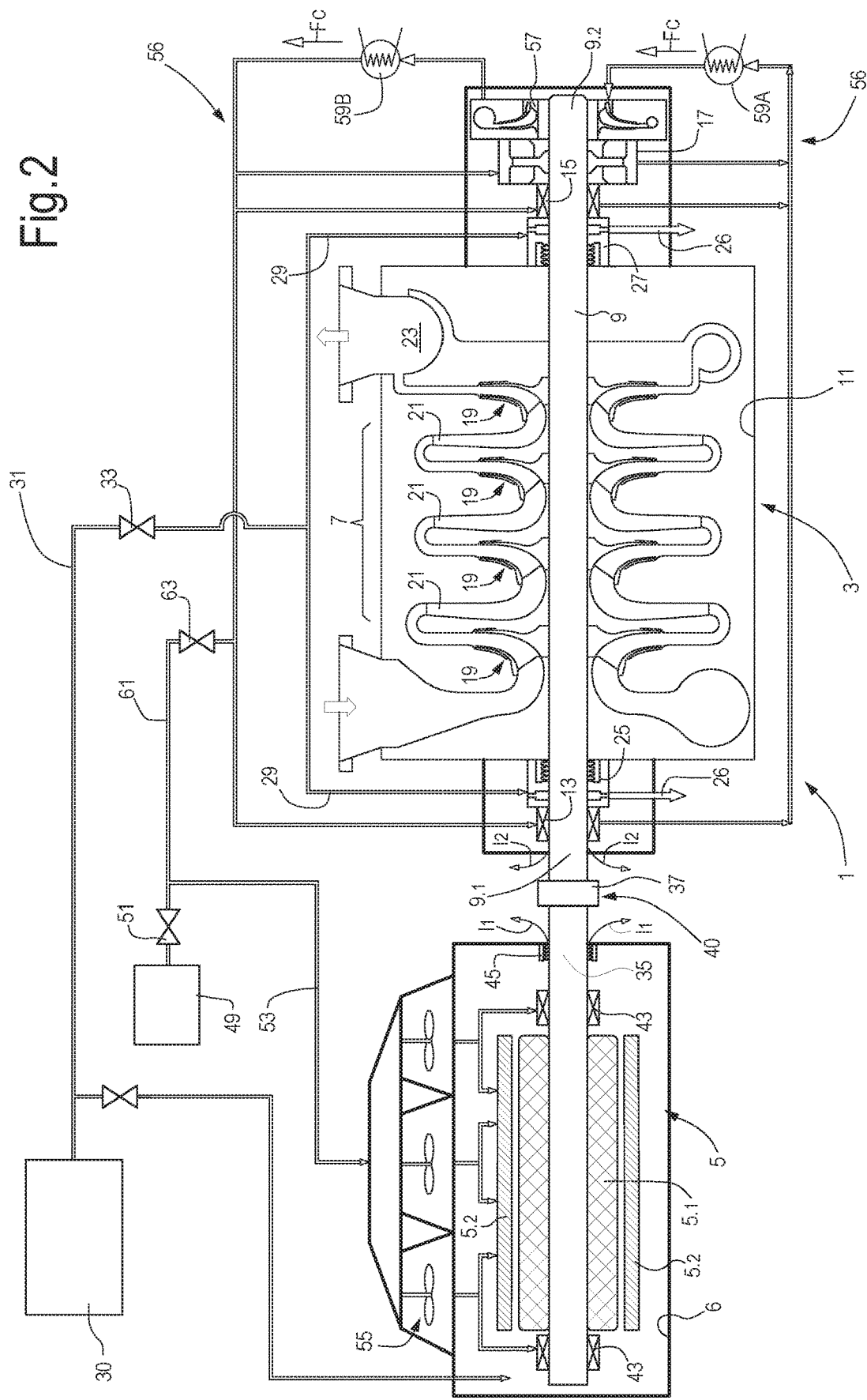
FIG. 2 illustrates a schematic of a turbomachine system according to a second embodiment.

While in the exemplary embodiments of FIGS. 1 and 2 a turbomachine system 1 is disclosed, which comprises a single driven turbomachine, e.g. a single compressor, those skilled in the art will appreciate that more than one driven turbomachine 3 can be provided. For instance two or more compressors can be aligned along the same shaft line. Flexible joints can be provided between two sequentially arranged turbomachines. In some embodiments, not shown, a gear box can be provided between sequentially arranged machines along the shaft line, e.g. between the mover and one of the driven turbomachines, and/or between two sequentially arranged driven turbomachines.

If more than one driven turbomachine are provided, they can be arranged all on the same side of the mover, or can be distributed on both sides of the mover, i.e. the mover can be located between two driven turbomachines.

If more than one driven turbomachine are provided, at least one of them can be provided with active magnetic bearings and with a relevant closed cooling circuit.

When the turbomachine 3 is a compressor, a pump or another driven turbomachine, the rotary machine 5 is a mover, i.e. a mechanical power generating machine, for instance an electric motor 5, which drives into rotation the driven turbomachine(s) 3. In other embodiments, a different mechanical power generating machine can be used, e.g. a turboexpander, a turbine or the like.

The compressor 3 comprises a compressor rotor 7 having a compressor shaft 9. The compressor rotor 7 and the compressor shaft 9 are mounted for co-rotation in a compressor casing 11. The compressor shaft 9 has a first shaft end 9.1 and a second shaft end 9.2. The compressor shaft 9 can be supported in the compressor casing 11 by means of active magnetic bearings (shortly referred to here on also as AMBs). The AMBs can include radial active magnetic bearings and axial active magnetic bearings, i.e. thrust magnetic bearings. In the embodiment of FIG. 1 the compressor shaft 9 is supported by two radial AMBs 13, 15 and by one axial AMB 17. The two radial AMBs 13, 15 are arranged between the compressor rotor 7 and a respective one of said first shaft end 9.1 and second shaft end 9.2. The axial AMB 17 can be positioned between the compressor rotor 7 and the second shaft end 9.2 of the compressor shaft 9, as shown in FIG. 1. In other embodiments, the axial AMB 17 can be located at the opposite side, i.e. between the compressor rotor 7 and the first shaft end 9.1.

The compressor 3 of FIG. 1 is a multistage centrifugal compressor comprising a plurality of impellers 19 constrained to the compressor shaft 9 between the two radial AMB 13, 15. In other embodiments, the compressor 3 can be a single-stage compressor with a single impeller. Each impeller 19, except the last one, is associated with a return channel 21. The last impeller is fluidly coupled to a volute 23.

In other embodiments, not shown, the compressor can be an axial compressor, for instance a multi-stage axial compressor.

In some embodiments, sealing arrangements are provided around the compressor shaft 9, for instance between the rotor and each one of the first shaft end 9.1 and second shaft end 9.2. The sealing arrangements can be positioned between the rotor and the respective active magnetic bearing or active magnetic bearing aggregate, such as to reduce or prevent leakages of process gas from the compressor impellers towards the AMBs.

In order to effectively reduce process gas leakages, dry gas seals can be provided. Air, nitrogen or other inert gas can be used as buffering fluid for the dry gas seals. In FIG. 1 dry gas seals are shown at 25, adjacent the first shaft end 9.1, and at 27, adjacent the second shaft end 9.2.

Dry gas deliver ducts 29 are provided, to feed dry gas to the dry gas seals 25, 27. Dry gas can be provided by a dry-gas source 30, connected to the dry gas delivery ducts 29 through a main delivery line 31 and a pressure reduction valve 33.

Dry gas seals are known in the art and are not described in greater detail herein. Dry gas seals usually have a discharge chamber, where dry gas leakages are collected and vented through a secondary vent 26. Since the dry gas is usually an inert, non-polluting gas, such as nitrogen, the gas collected in the discharge chamber can be vented in the atmosphere.

In the embodiment of FIG. 1, the first shaft end 9.1 is drivingly coupled to a motor shaft 35 of the electric motor 5. A joint, for example a flexible joint 37, can be provided between the compressor shaft 9 and the motor shaft 35. The flexible joint 37 can compensate for misalignments between the motor shaft 35 and the compressor shaft 9, delivering the torque required to operate the compressor 3.

In the embodiment of FIG. 1, the motor shaft 35, the joint 37 and the compressor shaft 9 form a shaft line 40, which drivingly couples the compressor 3 to the electric motor 5, such that the compressor 3 and the electric motor 5 rotate at the same rotational speed. A gear box between the electric motor 5 and the compressor 3 can thus be dispensed with.

The electric motor 5 is provided with a rotor 5.1 mounted on the motor shaft 35 and rotating therewith. The rotor 5.1 is arranged coaxial to and within a stator 5.2, stationarily housed in a motor casing 6.

The motor casing 6 is separate from the compressor casing 11. The motor shaft 35 extends from the interior of the motor casing 6 towards the compressor 3. The compressor shaft 9 extends with the first shaft end 9.2 thereof outside the compressor casing 11 towards the electric motor 5. With this arrangement, the electric motor 5 is separated from the compressor 3, and contamination of the interior of the motor casing 6 by gas processed by the compressor 3 is avoided.

The motor shaft 35 can be supported by bearings 43. In some embodiments the bearings 43 can be active magnetic bearings. For instance, two radial active magnetic bearings can be arranged at opposite sides of the rotor 5.1 of the electric motor 5. An axial bearing (not shown) can optionally be provided. A sealing 45 can be arranged around the motor shaft 35 at the side thereof which extends from the motor casing 6. The sealing 45 can be located between the rotor 5.1 and the active magnetic bearing 43 or between the active magnetic bearing 43 and the casing 6, as shown in FIG. 1. The sealing 45 can be a labyrinth seal.

The sealing 45 reduces leakages of a cooling fluid from the interior of the motor casing 6 towards the environment. Since leakages cannot be avoided entirely, as schematically represented by arrows 11, the interior of the motor casing 6 can be fluidly coupled to a source of cooling fluid 49. The source of cooling fluid 49 can be a source of so-called instrument air, i.e. clean air. As used herein the term "instrument air" can refer to an extremely clean supply of compressed air that is free from contaminates such as moisture and particulates.

The source of cooling fluid 49 can provide cooling fluid at a first pressure, for instance a pressure around 5 barA or higher, e.g. around or above 9 barA. A pressure reduction valve 51 can be provided along a cooling fluid delivery duct 53, which fluidly couples the interior of the motor casing 6 to the source of cooling fluid 49. The pressure of cooling fluid within the motor casing 6 can be substantially lower than the pressure at which the cooling fluid is available from the source of cooling fluid 49. For instance, the pressure inside the motor casing 6 can be around 1-2 barA, preferably slightly above ambient pressure, to prevent penetration of polluting agents into the motor casing 6.

The pressure values set forth above are provided by way of example only and do not limit the scope of the disclosure.

The electric motor 5 and relevant active magnetic bearings 43 are cooled by the cooling fluid forcedly circulated by one or more fans, schematically shown at 55, through a closed cooling circuit of the electric motor 5. The cooling circuit of the electric motor 5 and of the AMBs thereof is known per se and will not be described in greater detail herein.

The active magnetic bearings 13, 15, 17 of compressor 3 require cooling as well. A closed cooling circuit 56 is provided for circulating a cooling fluid through the active magnetic bearings of the compressor 3 and remove heat therefrom. The cooling fluid used for cooling the active magnetic bearings 13, 15, 17 of the compressor 3 is, in an embodiment, a fluid different from the process gas circulating through the compressor 3 and processed thereby. The cooling circuit is also fluidly separated from the circuit of the process gas. The compressor 3 can thus process any kind of gas, irrespective of the compatibility thereof with the active magnetic bearings, since the AMB cooling circuit and the process gas circuit are fluidly isolated from one another. Moreover, the cooling circuit 56 is fluidly separated from the cooling circuit of the electric motor 5, such that no contamination can occur from the process gas processed by the compressor 3 to the interior of the electric motor 5.

The cooling circuit 56 for the active magnetic bearings of compressor 3 can comprise a cooling fluid impeller 57. The cooling circuit 56 can further include at least one heat exchanger 59. In the embodiment of FIG. 1 the heat exchanger 59 is arranged upstream of the cooling fluid impeller 57 with respect to the cooling fluid flow, represented by arrow Fc, through the cooling circuit 56.

In embodiments disclosed herein, the cooling fluid impeller 57 is mounted on the compressor shaft 9 for rotation therewith, inside the casing 11 of the compressor 3. In some embodiments, the cooling fluid impeller 57 is mounted at, or near one of the first shaft end 9.1 and second shaft end 9.2. Preferably, the cooling fluid impeller 57 is mounted cantileverly, i.e. in an overhung position on the respective end of the compressor shaft 9. In FIG. 1 the cooling fluid impeller 57 is mounted overhangingly at the second shaft end 9.2 of the compressor shaft 9, i.e. opposite the electric motor 5, outside the respective active magnetic bearings 15, 17.

The cooling fluid impeller 57 is thus driven by the electric motor 5 which also drives into rotation the compressor 3, such that no separate motor is required to circulate the cooling fluid in the cooling fluid circuit 56. Moreover, the cooling fluid impeller 57 is supported directly by the compressor shaft 9, such that no separate impeller shaft and separate bearings are needed. No additional lubrication circuit for the impeller bearings is required.

By arranging the cooling fluid impeller 57 on the second shaft end 9.2 of the compressor shaft 9, opposite the first shaft end 9.1, which is drivingly coupled to the electric motor 5, assembling of the cooling fluid impeller 57 is simple and access thereto is facilitated, e.g. for maintenance or repairing purposes.

The cooling fluid impeller 57 absorbs a minimum amount of power from the electric motor 5. Only such power is needed, which is required to overcome the head losses along the closed cooling circuit 56.

The pressure of the closed cooling circuit 56 can be slightly higher than the ambient pressure, such that the active magnetic bearings can be removed avoiding ingress of ambient air in the cooling circuit. A so-called tertiary seal can be provided between each dry gas seal 25, 27 and the relevant active magnetic bearing, to separate the thy gas seal from the active magnetic bearing.

Leakages of cooling fluid can be reduced by providing suitable sealing arrangements at the AMBs 13, 15, 17 of compressor 3. Nonetheless, leakages 12 may still occur. The pressure inside the closed cooling circuit 56 can be restored by cooling fluid provided by a source of cooling fluid. The source of cooling fluid for the closed cooling circuit 56 of the active magnetic bearings 13, 15, 17 of compressor 3 can be the same source of cooling fluid 49, which provides cooling fluid to the electric motor 5. A cooling fluid delivery duct 61 can be provided to fluidly couple the source 49 of cooling fluid (or another separate source of cooling fluid) to the closed cooling circuit 56 of compressor 3.

A pressure reduction device 63 can be provided along the closed cooling fluid delivery duct 61, such that the cooling fluid required to restore pressure in the closed cooling circuit 56 is provided at the required pressure, avoiding unnecessary overpressure in the closed cooling circuit 56, which would only increase leakages towards the environment, without any advantage in terms of heat removal.

The heat exchanger 59 can be in heat exchange relationship with any suitable heat sink, for instance ambient air, water or the like.

In the embodiment of FIG. 1 the heat exchanger 59 is arranged upstream of the impeller 57. This, however, is not mandatory. In other embodiments, the heat exchanger 59 can be arranged downstream of the impeller 57. In yet further embodiments, more than one heat exchanger can be provided, for instance both upstream as well as downstream of the cooling fluid impeller 57. This embodiment is shown in FIG. 2, where the two heat exchangers are labeled 59A, 59B.

While in FIGS. 1 and 2 a simple turbomachine system is disclosed, which comprises only two pieces of machinery, namely a driven turbomachine 3, e.g. a compressor, and a driving machine 5, e.g. an electric motor, in other embodiments the turbomachine system can comprise more than two pieces of machinery. For instance, a mover, i.e. a mechanical power generating machine, such as an electric motor, can be drivingly coupled to two or more driven turbomachines 3. These can be identical to one another or different from one another. For instance, one or more compressors and one or more pumps can be drivingly coupled along the same shaft line with a mover. In other embodiments, two or more compressors, or eke two or more pumps can be arranged along a shaft line and driven into rotation by a mover.

The arrangement can be such that the mover, i.e. the mechanical power generating machine, is arranged at one end of the shaft line and the driven turbomachines are arranged in sequence on one and the same side of the mechanical power generating machine. In other arrangements, the mover can be located in an intermediate position along the shaft line, and one or more driven turbomachines can be positioned at each side of the mechanical power generating machine. The mechanical power generating machine can thus be provided with a through shaft, which extends on both sides from the relevant casing.

Figure 3:
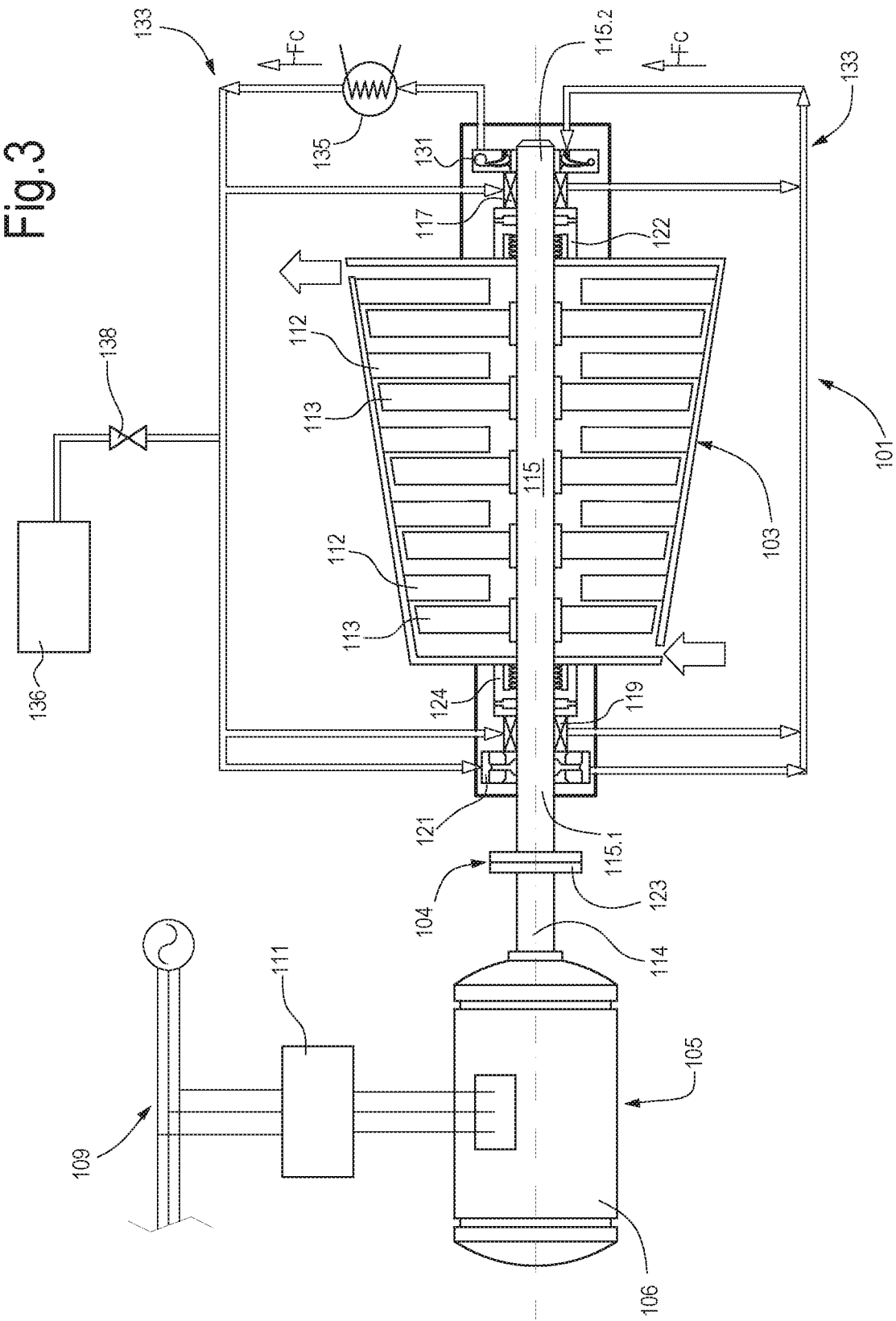
FIG. 3 illustrates a schematic of a turbomachine system according to a third embodiment.

While in FIGS. 1 and 2 the turbomachine 3 is a driven load driven into rotation by a mechanical power generating machine, i.e. the electric motor 5, in other embodiments the turbomachine 3 can be a mechanical power generating turbomachine, drivingly coupled to a load. FIG. 3 illustrates an exemplary embodiment of a turbomachine system 101 comprising a mechanical power generating turbomachine 103, for instance a turbo-expander. In other embodiments the power generating turbomachine 103 can be a turbine, for instance a gas turbine, or a steam turbine.

In FIG. 3 the mechanical power generating turbomachine 103 is schematically represented as a multi-stage axial turbo-expander. It shall however be understood that other power generating turbomachines can be used, such as radial turbines or radial turbo-expanders, such as centripetal or centrifugal turbo-expanders or turbines. Moreover, while in FIG. 3 the turbomachine 103 is a multi-stage turbomachine, in other embodiments a single-stage turbomachine, e.g. a single-stage radial turbine or turbo-expander can be used.

The turbo-expander 103 is drivingly coupled to a load 105 through a shaft line 104. Preferably, the shaft line 104 does not include a gear box and the load 105 rotates at the same rotary speed as the power generating turbomachine 103.

The load 105 can be an electric machine, e.g. an electric generator. The electric generator 105 can have a structure similar to the electric motor 5, with a rotor mounted on a generator shaft for co-rotation therewith within a generator casing 106. The rotor is coaxial to a stator housed in the generator casing 106. The generator shaft can be supported by active magnetic bearings, not shown. A cooling system can be provided, for cooling the stator and the rotor of the electric generator 105, as well as the active magnetic bearings thereof, quite in the same manner as described above in connection with electric motor 5 shown in FIGS. 1 and 2.

The electric generator 105 can be electrically coupled to an electric power distribution grid 109. An electric power conditioning device 111 can be interposed between the electric generator 105 and the electric power distribution grid 109. The electric power conditioning device 111 can adapt the frequency and phase of the electric power generated by the electric generator 105 to the frequency and phase of the electric power distribution grid 109.

The power generating turbomachine, i.e. the turbo-expander 103, comprises a turbo-expander casing 112 and a turbo-expander rotor 113 mounted for rotation in the turbo-expander casing 112. The turbo-expander rotor 113 can comprise or can be mounted on a turbo-expander shaft 115 supported for rotation in the turbo-expander casing 112. The turbo-expander shaft 115 can be supported by active magnetic bearings. In some embodiments, the turbo-expander shaft 115 can be supported by two radial active magnetic bearings 117, 119 and one axial or thrust active magnetic bearing 121. The active magnetic bearings 117, 119, 121 can be arranged near a first shaft end 115.1 and a second shaft end 115.2. In FIG. 3 the thrust active magnetic bearing 121 is arranged adjacent the first shaft end 115.2. However, the active magnetic bearing arrangement 117, 119, 121 can be reversed with respect to the one shown by example in FIG. 3. For instance, the thrust active magnetic bearing 121 can be arranged at the second shaft end 115.2.

Dry gas seals 122 and 124 can be provided, to fluidly separate the turbo-expander rotor 113 from the AMBs 117, 119 and 121.

The first shaft end 115.1 can extend outside the turbo-expander casing 112 and can be connected to an electric generator shaft 114 through a joint 123 forming part of the shaft line 104.

The second shaft end 115.2 is arranged on the side of the turbo-expander 103 opposite the electric generator 105 and can be entirely housed in the turbo-expander casing 112.

The active magnetic bearing arrangement 117, 119, 121 of the turbo-expander 103 is provided with a cooling system similar to the cooling system of the active magnetic bearings of compressor 3 of FIGS. 1 and 2. Only the main components of the AMB cooling system for the turbo-expander 103 will thus be described. The cooling system can comprise a cooling fluid impeller 131, which can be mounted on turbo-expander shaft 115 for co-rotation therewith inside the turbo-expander casing 112.

In the exemplary embodiment of FIG. 3 the cooling fluid impeller 131 is mounted in an overhung configuration at the second shaft end 115.2, i.e. at the side of the turbo-expander 103 opposite the electric generator 105. The cooling fluid impeller 131 is driven into rotation by mechanical power generated by the turbo-expander 103 and circulates a cooling fluid through a closed cooling circuit 133, which fluidly couples the cooling fluid impeller 131 to the active magnetic bearings 117, 119, 121.

The closed cooling circuit 133 comprises at least one heat exchanger 135, to remove heat from the cooling fluid. In the exemplary embodiment of FIG. 3 the heat exchanger 135 is arranged downstream of the cooling fluid impeller 131 with respect to the direction of the cooling fluid flow (arrow Fc). In other embodiments, not shown, the heat exchanger 135 can be arranged upstream of the cooling fluid impeller 131, or heat exchangers can be arranged upstream as well as downstream of the cooling fluid impeller 131.

The closed cooling circuit 133 can be fluidly coupled to a source of cooling fluid, schematically shown at 136, which can be fluidly coupled also to the cooling circuit of the electric generator 105, similar to the source of cooling fluid 49 described in connection with FIG. 1. Cooling fluid provided by the source of cooling fluid 136 can restore the pressure in the cooling fluid circuits of the electric generator 105 and of the turbo-expander 103, balancing pressure drops due to leakages through the shaft seals. The source of cooling fluid 136 can be a source of nitrogen, or of instrument air, or a source of any other gas or gas mixture which is compatible with the active magnetic bearings. A pressure reduction device 138 can be arranged along a duct connecting the closed cooling circuit 133 and the source of cooling fluid 136.

Thus, similarly to the embodiments of FIGS. 1 and 2, also in FIG. 3 the process gas expanding in the turbo-expander 103 can be any fluid, for instance one which shall not get in contact with the active magnetic bearings. The use of a closed cooling circuit 133, wherein a cooling fluid different from the fluid expanding in the turbo-expander 103, ensures safe operation and cooling of the active magnetic bearings.

While in FIG. 3 a simple turbomachine system 101 with only two pieces of machinery is shown, namely a single mechanical power generating turbomachine 103 and a rotary load 105, in other embodiments a more complex turbomachine system 101 can be provided, with more than just two rotating machines.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

The invention claimed is:

1. A turbomachine system comprising:
a turbomachine configured to process a fluid, the turbomachine comprising a turbomachine rotor having a turbomachine shaft with a first shaft end and a second shaft end, the turbomachine shaft being supported by active magnetic bearings for rotation in a turbomachine casing, and the first shaft end extending outside the turbomachine casing;
a rotary machine coupled to the first shaft end of the turbomachine shaft to drive the turbomachine, the rotary machine housed in a rotary machine casing separated from the turbomachine casing;
a shaft line extending between the turbomachine casing and the rotary machine casing drivingly connects the turbomachine to the rotary machine;
a first closed cooling circuit configured to circulate a cooling fluid therein and fluidly coupled to the active magnetic bearings and to a cooling fluid source configured to restore a cooling fluid pressure in the first closed cooling circuit, the first closed cooling circuit comprising a cooling fluid impeller rotatably mounted on the turbomachine shaft at the second shaft end inside the turbomachine casing and driven by the rotary machine, the cooling fluid impeller configured to circulate the cooling fluid in the first closed cooling circuit to cool the active magnetic bearings;
a second closed cooling circuit configured to circulate a cooling fluid therein and fluidly coupled to the rotary machine and to the cooling fluid source, the second closed cooling circuit comprising a circulation fan to circulate the cooling fluid entering the rotary machine casing from the second closed cooling circuit to cool the rotary machine; and
a pressure reduction device is arranged between the cooling fluid source and the first closed cooling circuit, wherein the first closed loop cooling circuit is fluidly separated from the second closed loop cooling circuit, the fluid processed by the turbomachine is different than the cooling fluid respectively supplied to and circulating in the first closed cooling circuit and the second closed cooling circuit, and the cooling fluid source provides cooling fluid at a first pressure higher than a second pressure in the first closed cooling circuit.

2. The turbomachine system of claim 1, wherein the cooling fluid is an inert fluid or a fluid compatible with the active magnetic bearings.

3. The turbomachine system of claim 1, further comprising a sealing arrangement configured to fluidly separate the first closed cooling circuit from an internal volume of the turbomachine containing a turbomachine process gas.

4. The turbomachine system of claim 1, wherein the first closed cooling circuit is fluidly coupled with all active magnetic bearings supporting the turbomachine shaft.

5. The turbomachine system of claim 1, wherein the rotary machine is an electric machine.

6. The turbomachine system of claim 1, wherein the turbomachine is one of a compressor and a pump.

7. The turbomachine system of claim 1, wherein the rotary machine is an electric motor.

8. The turbomachine system of claim 1, wherein the rotary machine comprises a rotor rotatingly supported by active magnetic bearings and the second closed cooling circuit is fluidly coupled to the active magnetic bearings of the rotary machine such that the cooling fluid circulated by the circulation fan cools the rotor and the active magnetic bearings of the rotary machine.

9. The turbomachine system of claim 8, wherein the first closed cooling circuit further comprises a first heat exchanger upstream of the impeller and a second heat exchanger downstream of the impeller.

10. The turbomachine system of claim 1, further comprising a non-return device configured to prevent leakage of cooling fluid from the first closed cooling circuit to the second closed cooling circuit.

11. The turbomachine system of claim 1, further comprising dry gas seals between the turbomachine rotor and the active magnetic bearings supporting the turbomachine rotor and dry gas delivery ducts fluidly coupling the dry gas seals to a dry-gas source, wherein the dry-gas source is fluidly separated from the first closed cooling circuit.

12. A turbomachine system comprising:
a compressor configured to process a fluid, the compressor comprising a compressor rotor having a compressor shaft with a first shaft end and a second shaft end, the compressor shaft supported by active magnetic bearings for rotation in a compressor casing, the first shaft end extending outside the compressor casing;
an electric motor configured to rotate the compressor rotor, the electric motor comprising a stator housed in a motor casing and a rotor supported for rotation in the motor casing, the rotor having a motor shaft extending from the motor casing and drivingly coupled with the first shaft end of the compressor shaft;
a first closed cooling circuit configured to circulate a cooling fluid therein and fluidly coupled to the active magnetic bearings of the compressor, the first closed cooling circuit comprising an impeller mounted inside the compressor casing on the compressor shaft at the second shaft end for rotation therewith and configured to circulate the cooling fluid in the first closed cooling circuit to cool the active magnetic bearings of the compressor;
a second closed cooling circuit configured to circulate a cooling fluid therein and fluidly coupled to the electric motor, the second closed cooling circuit comprising a circulation fan arranged in the motor casing and configured to circulate the cooling fluid entering the motor casing from the second closed cooling circuit to cool the electric motor;

a source of cooling fluid fluidly coupled to the first closed cooling circuit and to the second closed cooling circuit to restore a cooling fluid pressure in the respective closed cooling circuit; and a pressure reduction device is arranged between the cooling fluid source and the first closed cooling circuit, wherein the first closed loop cooling circuit is fluidly separated from the second closed loop cooling circuit, the fluid processed by the turbomachine is different than the cooling fluid respectively supplied to and circulating in the first closed cooling circuit and the second closed cooling circuit, and the cooling fluid source provides cooling fluid at a first pressure higher than a second pressure in the first closed cooling circuit.

13. The turbomachine system of claim 12, wherein the motor shaft is supported by active magnetic bearings, and the second cooling circuit is configured to remove heat from the active magnetic bearings of the electric motor and from the stator and rotor of the electric motor.

14. The turbomachine system of claim 12, wherein the first closed cooling circuit further comprises a first heat exchanger upstream of the impeller and a second heat exchanger downstream of the impeller.

15. The turbomachine system of claim 1, wherein the active magnetic bearings include a radial magnetic bearing and an axial magnetic bearing.

16. The turbomachine system of claim 15, wherein the active magnetic bearings include two radial magnetic bearings, with one of the two radial magnetic bearings arranged between the turbomachine rotor and the first shaft end and the other of the two radial magnetic bearings arranged between the turbomachine rotor and the second shaft end, and one axial magnetic bearing arranged between the turbomachine rotor and the second shaft end.

17. A turbomachine system comprising:
a turbomachine configured to process a fluid, the turbomachine comprising a turbomachine rotor having a turbomachine shaft with a first shaft end and a second shaft end, the turbomachine shaft being supported by active magnetic bearings for rotation in a turbomachine casing, and the first shaft end extending outside the turbomachine casing;

a rotary machine coupled to the first shaft end of the turbomachine shaft to drive the turbomachine, the rotary machine housed in a rotary machine casing separated from the turbomachine casing;

a shaft line extending between the turbomachine casing and the rotary machine casing drivingly connects the turbomachine to the rotary machine;

a first closed cooling circuit configured to circulate a cooling fluid therein and fluidly coupled to the active magnetic bearings and to a cooling fluid source configured to restore a cooling fluid pressure in the first closed cooling circuit, the first closed cooling circuit comprising a cooling fluid impeller rotatably mounted on the turbomachine shaft at the second shaft end inside the turbomachine casing and driven by the rotary machine, the cooling fluid impeller configured to circulate the cooling fluid in the first closed cooling circuit to cool the active magnetic bearings;

a second closed cooling circuit configured to circulate a cooling fluid therein and fluidly coupled to the rotary machine and to the cooling fluid source, the second closed cooling circuit comprising a circulation fan to circulate the cooling fluid entering the rotary machine casing from the second closed cooling circuit to cool the rotary machine; and a non-return device configured to prevent leakage of cooling fluid from the first closed cooling circuit to the second closed cooling circuit, wherein the first closed loop cooling circuit is fluidly separated from the second closed loop cooling circuit, and the fluid processed by the turbomachine is different than the cooling fluid respectively supplied to and circulating in the first closed cooling circuit and the second closed cooling circuit.

18. The turbomachine system of claim 17, further comprising a pressure reduction device is arranged between the cooling fluid source and the first closed cooling circuit.

19. A turbomachine system comprising:
a compressor configured to process a fluid, the compressor comprising a compressor rotor having a compressor shaft with a first shaft end and a second shaft end, the compressor shaft supported by active magnetic bearings for rotation in a compressor casing, the first shaft end extending outside the compressor casing;

an electric motor configured to rotate the compressor rotor, the electric motor comprising a stator housed in a motor casing and a rotor supported for rotation in the motor casing, the rotor having a motor shaft extending from the motor casing and drivingly coupled with the first shaft end of the compressor shaft;

a first closed cooling circuit configured to circulate a cooling fluid therein and fluidly coupled to the active magnetic bearings of the compressor, the first closed cooling circuit comprising an impeller mounted inside the compressor casing on the compressor shaft at the second shaft end for rotation therewith and configured to circulate the cooling fluid in the first closed cooling circuit to cool the active magnetic bearings of the compressor;

a second closed cooling circuit configured to circulate a cooling fluid therein and fluidly coupled to the electric motor, the second closed cooling circuit comprising a circulation fan arranged in the motor casing and configured to circulate the cooling fluid entering the motor casing from the second closed cooling circuit to cool the electric motor;

a source of cooling fluid fluidly coupled to the first closed cooling circuit and to the second closed cooling circuit to restore a cooling fluid pressure in the respective closed cooling circuit; and a non-return device configured to prevent leakage of cooling fluid from the first closed cooling circuit to the second closed cooling circuit, wherein the first closed loop cooling circuit is fluidly separated from the second closed loop cooling circuit, and the fluid processed by the turbomachine is different than the cooling fluid respectively supplied to and circulating in the first closed cooling circuit and the second closed cooling circuit.

20. The turbomachine system of claim 19, further comprising a pressure reduction device is arranged between the cooling fluid source and the first closed cooling circuit.

* * * * *